United States Patent [19]

Aalo

[11] 3,946,924
[45] Mar. 30, 1976

[54] TUBE HAUL-OFF MACHINE

[75] Inventor: Arnold Aalo, Porsgrunn, Norway

[73] Assignee: Granges Essem Plast A/S, Porsgrunn, Norway

[22] Filed: Nov. 1, 1974

[21] Appl. No.: 520,213

[30] Foreign Application Priority Data
Nov. 5, 1973 Norway................ 4245/73

[52] U.S. Cl. .............. 226/176; 74/25; 226/181
[51] Int. Cl.[2] .................................. F16H 13/08
[58] Field of Search .......... 214/339; 226/176, 181; 74/25

[56] References Cited
UNITED STATES PATENTS

| | | | |
|---|---|---|---|
| 3,081,639 | 3/1963 | Hauptman | 214/339 X |
| 3,718,247 | 2/1973 | Dreher | 214/339 X |

Primary Examiner—Robert G. Sheridan

[57] ABSTRACT

A tube haul-off machine for extruded tubes comprising at least one pair of parallel spaced annular supporting wheels supported for rotation in opposite directions about a common axis. Each supporting wheel carries rotatable haul-off wheels which are arranged at a radial distance from the axis corresponding to the outer radius of the tube, and the axes of which are inclined relatively to the common axis. The haul-off wheels of one supporting wheel are inclined in the opposite direction of the haul-off wheels of the other supporting wheel. Upon rotation of the supporting wheels the haul-off wheels in engagement with the surface of the tube will travel along helices about said axis on the peripheral surface of the tube thereby to pull the tube along the axis.

4 Claims, 2 Drawing Figures

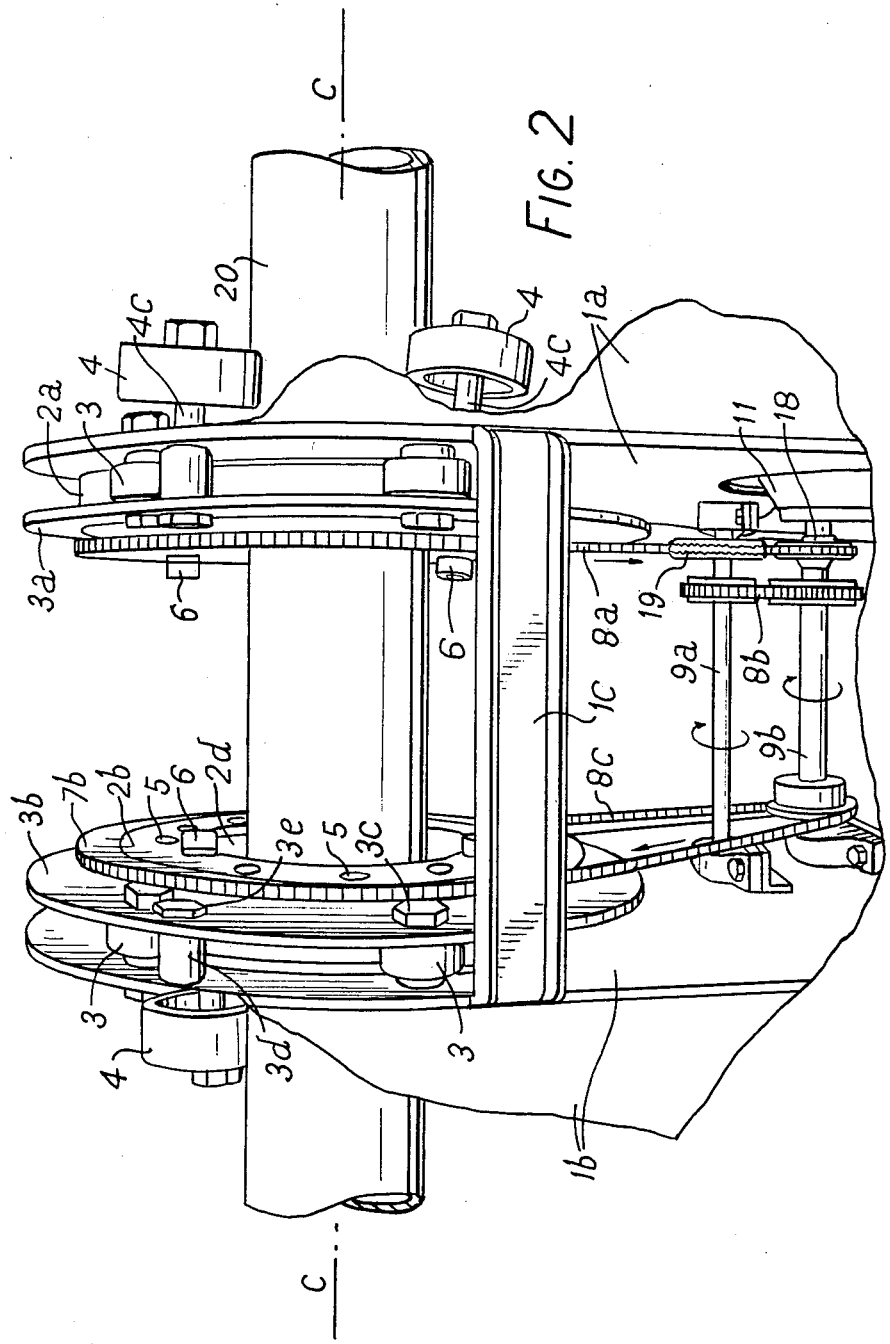

TUBE HAUL-OFF MACHINE

BACKGROUND OF THE INVENTION

The present invention relates to a tube haul-off machine.

Known tube haul-off machines for extruded tubes are generally equipped with haul-off belts or haul-off wheels which engage the peripheral surface of the tube and rotate in the axial direction thereof for pulling or pushing the tube through the machine by frictional engagement. The structure of such machines is relatively complicated and, therefore, the purchase of such known machines is expensive, and the maintenance thereof time-consuming.

SUMMARY OF THE INVENTION

According to the present invention there is provided a tube haul-off machine comprising at least one pair of parallel spaced annular supporting wheels supported for rotation in opposite directions about a common axis, each supporting wheel carrying rotatable haul-off wheels which are arranged at a radial distance from the axis corresponding to the outer radius of the tube, and the axes of which are inclined relatively to the common axis, the haul-off wheels of one supporting wheel being inclined in the opposite direction of the haul-off wheels of the other supporting wheel, so that upon rotation of the supporting wheels in engagement with the surface of the tube the haul-off wheels will travel along helices about said axis on the peripheral surface of the tube thereby to pull the tube along the axis.

Thus, a machine is obtained the structure of which is very simple and sturdy compared with known tube haul-off machines. The tube haul-off machine according to the invention can also be space-saving since there is no need to increase the length of the machine materially when handling the largest type of tubes. Adjustment of the machine for use with tubes of various diameters may be accomplished if the haul-off wheels are detachably affixed to the supporting wheels for radial displacement relative to the axis of the tube and the machine.

Since the haul-off wheels move along helices around the tube, the strain on the tube wall will be substantially less than if haul-off wheels or belts were constantly engaging the same axially extending portion of the tube wall.

A preferred embodiment will now be described, reference being had to the accompanying drawings.

BRIEF DESCRIPTION OF THE DRAWINGS

FIG. 2 is another perspective view of the machine.

DETAILED DESCRIPTION OF THE PREFERRED EMBODIMENTS

Figure 1:
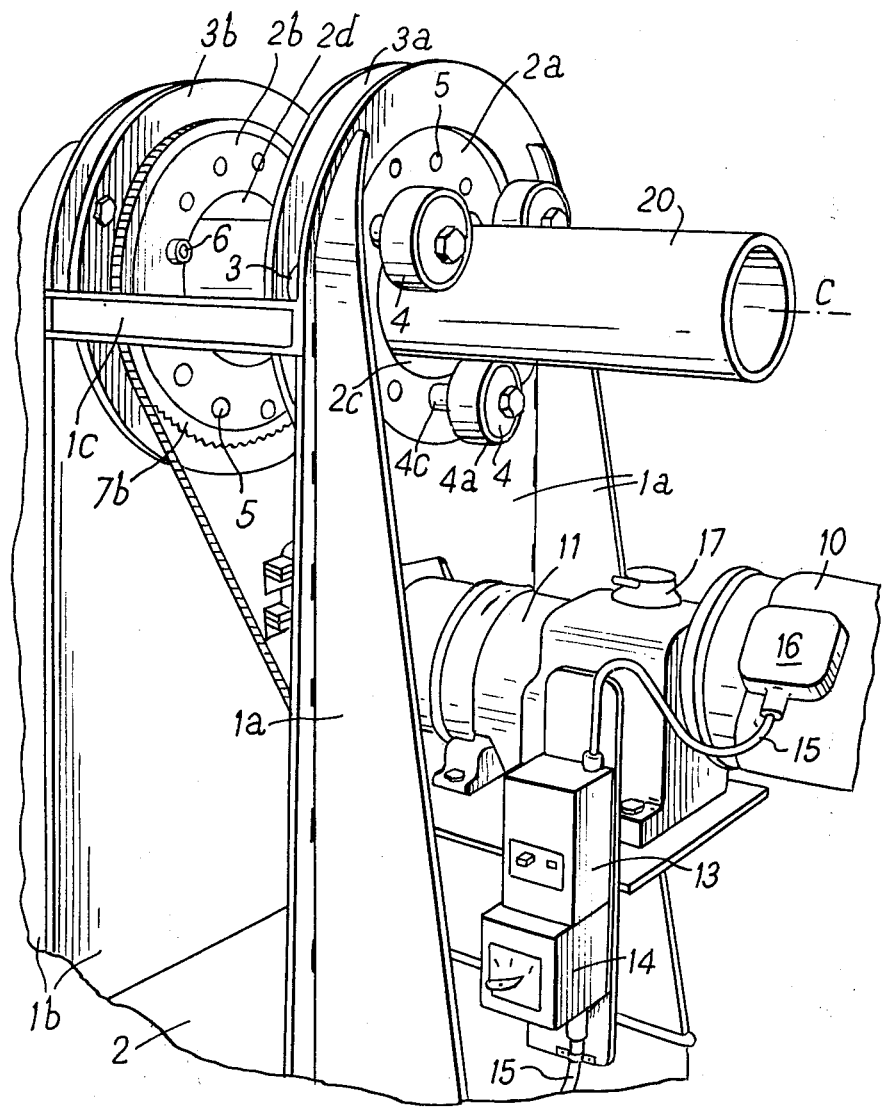
FIG. 1 is a perspective view of a section of a haul-off machine according to the invention.

In the drawings there are shown two framework members 1a and 1b, arranged vertically on a base 2 and held together by means of struts 1c. In the upper portion of each of the framework members an annular supporting wheel 2a, 2b, is rotatably mounted. The supporting wheels 2a, 2b are parallel and spaced, their respective circular center openings 2c, 2b being coaxial, i.e. having a common rotating axis C. For mounting of the supporting wheels roller bearings 3 are provided, which are mounted between the respective framework member, 1a or 1b, and an annular disc 3a or 3b, by means of through attachment bolts 3c. The discs 3a, 3b also serve the purpose of axially guiding the supporting wheels 2a, 2b and are secured to the framework members at a predetermined distance therefrom by means of tube-shaped spacers 3d and through clamping bolts 3e. On each supporting wheel 2a, 2b three haul-off wheels 4 are rotatably mounted, each of which is provided with a rubber coating 4a. The shafts 4c of these haul-off wheels are inclined relative to the common central rotating axis C of the supporting wheels. The haul-off wheels 4 may be positioned at various radial distances from the common rotating axis C of the supporting wheels, and in the drawing a plurality of guide bores 5 serving this purpose are shown. The shafts 4c of the haul-off wheels may be inserted in these bores and secured on the opposite side of the supporting wheel by means of a screw 6. Alternatively, the haul-off wheels may be affixed in radial guide slots, the position of the wheels in their guide slots being adjustable to suit the diameter of the tube.

The supporting wheels 2a, 2b are fixed to sprocket wheels 7a, 7b respectively which through chains 8a, 8b and 8c and shafts 9a, 9b are operatively connected with a motor 10 having a variator 11. In FIG. 1, 13 designates an on-off switch and 14 a change-over switch. 15 designates the supply cable to the drive motor and 16 designates the terminal box of the motor. The variator 11 is equipped with a manual setting device 17 for adjusting the output torque of the variator. The driving movement is transmitted to the supporting wheels 2a, 2b through the variator 11 and the shafts 9a and 9b in such a way that the supporting wheels 2a, 2b are rotated in opposite directions. In FIG. 2 the arrows indicate that the shafts 9a, 9b rotate in the same direction, whereas the chain 8a pulls in the opposite direction of the chains 8b, 8c due to a freewheel 18 on the shaft 9b and a sprocket wheel 19 which externally engages the chain 8a.

When a tube 20 is placed in the haul-off machine and the supporting wheels 2a, 2b are rotated in opposite directions, the haul-off wheels 4 on the supporting wheels 2a, 2b will travel along helices on the peripheral surface of the tube. Since the supporting wheels 2a, 2b move in opposite directions, the tangential frictional forces between the haul-off wheels 4 and the tube 20 will substantially cancel each other resulting in the tube 20 being hauled off in the axial direction without rotating about its own axis. The haul-off rate of the axial displacement of the tube may be varied by changing the inclination of the haul-off wheels 4 with respect to the common rotating axis C of the supporting wheels 2a, 2b or by changing the rotational speed of said supporting wheels.

The structure is such as to haul-off the tube 20 at the same speed whether the haul-off machine imparts a pulling or a braking effect, i.e. the haul-off machine is only to a minor extent influenced by the external forces to which the tube is subjected. This is of great practical importance as a haul-off machine of this type usually co-operates with subsequent stages in the production line, requiring the produced tube to be discharged at a predetermined rate.

Of course, the invention may be carried out in various other manners than the embodiment disclosed without departing from the scope of the invention, e.g. the number of haul-off wheels may vary and the coating on the haul-off wheels may be made from other materials than rubber, depending on the character of the surface of the tubes. Besides, the transmission between the driving motor and the supporting wheels may be effected by means of a belt drive, a gearwheel transmission or the like. Further, the number of supporting wheels may be a multiple of 2, but due to practical reasons two supporting wheels are preferred. The diameter of the haul-off wheels may be varied and the radial adjustment of the haul-off wheels may be accomplished by being displaced in radial slots in the supporting wheels.

What I claim is:

1. A tube haul-off machine comprising at least one pair of parallel spaced annular supporting wheels supported for rotation in opposite directions about a common axis, each supporting wheel carrying rotatable haul-off wheels which are arranged at a radial distance from the axis corresponding to the outer radius of the tube, and the axes of which are inclined relatively to the common axis, the haul-off wheels of one supporting wheel being inclined in the opposite direction of the haul-off wheels of the other supporting wheel so that upon rotation of the supporting wheels in engagement with the surface of the tube the haul-off wheels will travel along helices about said axis on the peripheral surface of the tube thereby to pull the tube along the axis.

2. A machine as claimed in claim 1 in which the haul-off wheels are detachably affixed to the supporting wheels, for radial displacement and positioning in accordance with the diameter of the tube.

3. A machine as claimed in claim 2 in which the shafts of the haul-off wheels are affixed in guide bores in the supporting wheels.

4. A machine as claimed in claim 1 in which the supporting wheels are supported by rollers at the periphery.

* * * * *